March 22, 1927.
P. ECKLEY
1,621,715
SPADING TOOL
Filed May 6, 1925
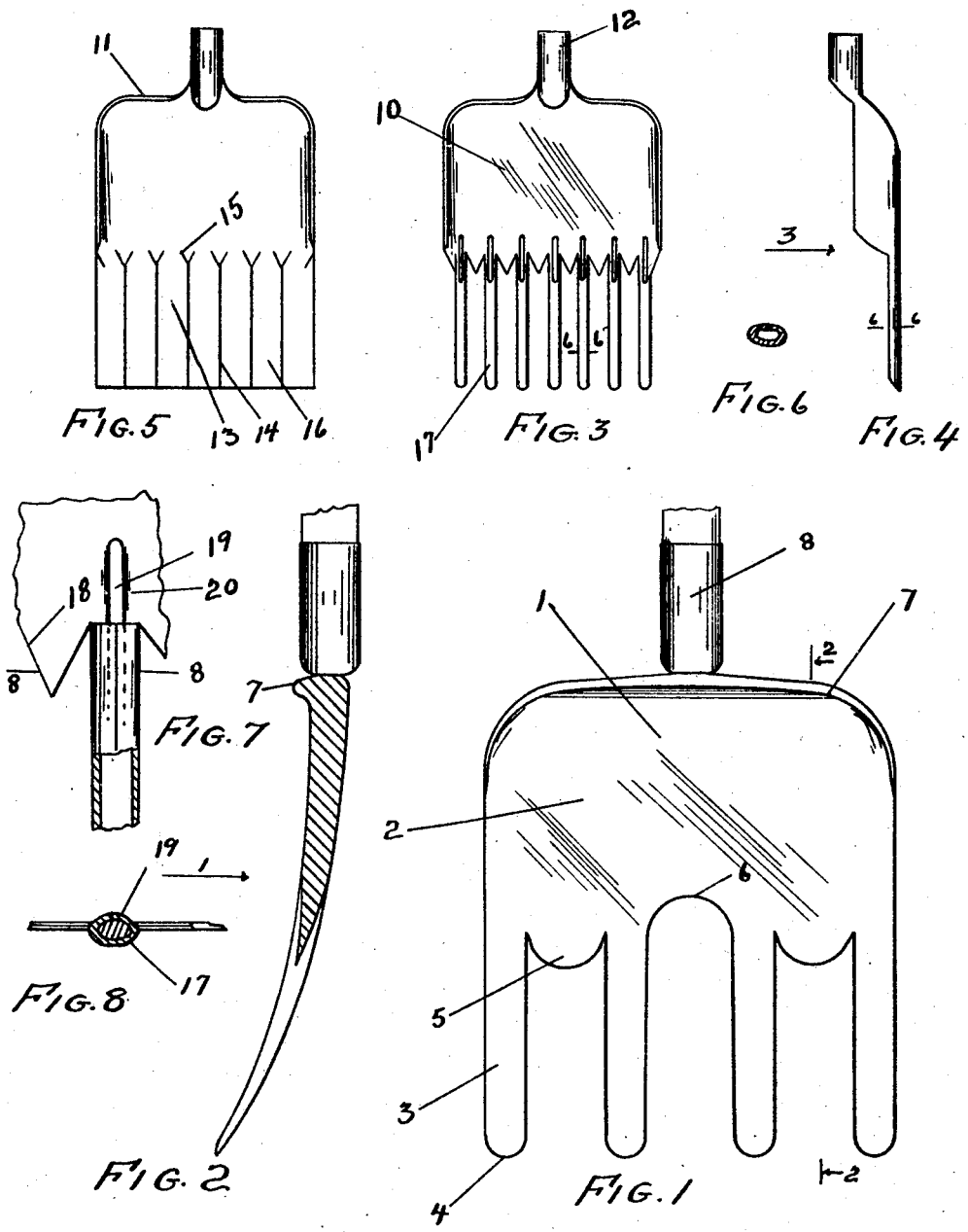
INVENTOR.
PAUL ECKLEY.
BY
ATTORNEYS.

Patented Mar. 22, 1927.

1,621,715

UNITED STATES PATENT OFFICE.

PAUL ECKLEY, OF WALNUT CREEK, CALIFORNIA.

SPADING TOOL.

Application filed May 6, 1925. Serial No. 28,349.

My invention is in a spading tool or shovel having spaced tines and a spade shovel section.

In the spading tool type of device, the tines join into the spade portion so that the device may either be used as a straight spading fork or may be dug deeper to operate as a digging spade. In the shovel form of device the tines are preferably placed to form a screening arrangement so that coal or the like may be screened and then shoveled by the scoop shovel part. My invention will be more readily understood from the following description and drawings in which:—

Figure 1 is a plan view of the spading tool as if viewed from the direction of the arrow 1 of Figure 2.

Figure 2 is a section of Figure 1 on the line 2—2 in the direction of the arrows, showing the cutting or digging edge of the spade part of the tool, and the projecting tines.

Figure 3 is a modification of my invention forming a tined scoop shovel, this being a plan view in the direction of the arrow 3 of Figure 4.

Figure 4 is an edge view of the shovel of Figure 3.

Figure 5 is a plan showing a metal blank with slits at the end to leave metal fingers from which the tines are rolled.

Figure 6 is an enlarged cross-section of one of the tines as if taken on the line 6—6 of Figure 3, showing the manner in which the tines are rolled.

Figures 7 and 8 are details showing the reinforcing of the rolled tine in a sheet metal shovel, indicating the cutting knives between the tines.

Figure 8 is a section of Figure 7 on the line 8—8.

Referring first to the spading tool of Figures 1 and 2, the tool as a whole is designated by the numeral 1, having a spade or body section 2, tines 3 formed on the ends of the body section, the tines having any suitable point 4. The spade or body part 2 is formed between the tines with convex cutting edges 5, and is shown with the center concave cutting edge 6. These edges may be considered as knife edges for a purpose hereafter described. A rib 7 forms the usual foot-hold and the socket of the usual type is designated by the numeral 8.

The various uses of the spading tool will be obvious. As many tines could be made as is desirable for the work and these could be shaped in accordance to the standard practice. By working the tines only into the soil, the implement may be used strictly as a spading fork, and by digging deeper it may be used as a digging spade. The cutting edges 5 and 6 are designed to cut various crops: for instance the spade may be shoved along the ground with the tines straddling a row of corn and the stalks of the corn will be cut by the cutting edges 5 and 6. The device may also be readily used for weeding, as the tines support the weeds while the edges 5 and 6 cut them. The tined scoop shovel of Figures 3 to 6 is preferably constructed of sheet metal and has a body portion 10 formed of an upturned edge 11, forming a scoop and the usual shank 12. The end 13 of the body blank, as shown in Figure 5, has a series of longitudinal slits 14 and diverging slits 15 at the inner edge. This leaves strips 16 which are rolled to form the tines.

The structure of the tines is best shown in Figures 3, 4 and 6, in which the tines 17 are shown extending in substantial alignment with the body of the shovel.

The tines may be formed in any suitable manner, that shown being by rolling the strips 16, as indicated in Figure 6. The body of the shovel between the tines 17 may be sharpened at the inner ends of the tines, as indicated at 18, whereby the device may be used for garden purposes.

Uses of my tined scoop shovel will be obvious: for instance in shoveling coal the tines will screen the coal before it is loaded on the scoop body 10. By spacing the tines at different distances, a scoop shovel of my design may be utilized for a variety of purposes.

It is to be noted that the sharpened edges 18 between the rolled tines of the sheet metal spade or shovel form converging edges. These, when sharpened, are an efficient cutting knife for weeding, cutting stalks or similar purposes, in that the tines form a backing or support for the stalks being cut.

The detail of Figures 7 and 8 indicates a reinforcing wire 19, inserted in the roll of the tine and embedded in a corrugation 20 in the back of the shovel body. This wire or rod is preferably welded to both the tine and the body of the shovel.

I have above described a new method of making a tined spade or shovel of sheet metal by forming the longitudinal or diverging slits at the end of the shovel body, rolling the tines, and at the same time forming the converging edged cutting knives between the tines.

Having described my invention what I claim is:—

1. An implement comprising a body portion having upturned edges, a shank attached to said body portion, a series of tubular tines projecting from said body portion, and a reinforcing rod secured to the interior of each tine and engaging said body portion.

2. An implement comprising a digging portion, and tines projecting from said digging portion, and reinforcing rods for said tines each rod reinforcing its respective tine along the longitudinal axis of the tine.

3. An implement comprising a body portion, a series of tubular tines projecting from said body portion, reinforcing rods disposed in said tubular tines, said body portion having cutting edges disposed between said tines.

In testimony whereof I affix my signature.

PAUL ECKLEY.